(12) United States Patent
Knaebel

(10) Patent No.: US 8,211,211 B1
(45) Date of Patent: Jul. 3, 2012

(54) MULTI-STAGE ADSORPTION SYSTEM FOR GAS MIXTURE SEPARATION

(75) Inventor: Kent S. Knaebel, Dublin, OH (US)

(73) Assignee: Kent S. Knaebel & Associates, Inc., Dublin, OH (US)

( * ) Notice: Subject to any disclaimer, the term of this patent is extended or adjusted under 35 U.S.C. 154(b) by 1316 days.

(21) Appl. No.: 11/903,899

(22) Filed: Sep. 25, 2007

(51) Int. Cl.
*B01D 53/047* (2006.01)

(52) U.S. Cl. ............ 95/96; 95/98; 95/119; 95/120; 95/122; 95/126; 95/130; 95/138; 95/139

(58) Field of Classification Search ........ 95/96–98, 95/104, 105, 114, 115, 117–122, 126, 130, 95/136, 138, 139, 143; 96/132; 423/210, 423/230, 239.1
See application file for complete search history.

(56) References Cited

U.S. PATENT DOCUMENTS

| | | | | |
|---|---|---|---|---|
| 4,000,990 A * | 1/1977 | Bingham | ........ | 95/103 |
| 4,770,676 A * | 9/1988 | Sircar et al. | ........ | 95/99 |
| 4,913,709 A * | 4/1990 | Kumar | ........ | 95/100 |
| 5,089,034 A * | 2/1992 | Markovs et al. | ........ | 95/99 |
| 5,536,300 A * | 7/1996 | Reinhold et al. | ........ | 95/101 |
| 6,197,092 B1 * | 3/2001 | Butwell et al. | ........ | 95/96 |
| 6,444,012 B1 * | 9/2002 | Dolan et al. | ........ | 95/99 |
| 7,815,713 B2 * | 10/2010 | Sorensen et al. | ........ | 95/50 |
| 2007/0068386 A1 * | 3/2007 | Mitariten | ........ | 95/116 |

* cited by examiner

*Primary Examiner* — Frank Lawrence, Jr.
(74) *Attorney, Agent, or Firm* — Mueller Law, LLC; Jerry K. Mueller, Jr.

(57) ABSTRACT

Methane product gas is produced from landfill gas and gob gas either by a three-stage process of PSA-TSA-PSA or PSA-PSA-PSA, or a two-stage process of PSA-PSA.

38 Claims, 5 Drawing Sheets

MULTI-STAGE ADSORPTION SYSTEM FOR GAS MIXTURE SEPARATION

CROSS-REFERENCE TO RELATED APPLICATIONS

None

STATEMENT REGARDING FEDERALLY SPONSORED RESEARCH

Not applicable.

BACKGROUND

1. Field of the Process

The present development relates to a method and an apparatus for separating a desired gas component from a gas mixture containing a plurality of gas components. More particularly, the present development relates to a multi-stage adsorption system to separate a methane-bearing feed gas, containing a plurality of components, including, for example, methane, carbon dioxide, nitrogen, oxygen, and water vapor. Other constituents may be present in small quantities in the methane-bearing feed gas, such as, for example, ethane, ethylene, hydrogen, hydrogen sulfide, and propane, with no significant impact on the operation of the present process. The present process produces a methane-rich product gas that meets certain purity requirements, e.g., for liquefaction or for distribution via pipeline, and a byproduct gas containing most of the carbon dioxide, nitrogen, oxygen, and water.

The present multi-stage adsorption system offers significant advantages compared with alternatives, e.g., other sequences of adsorption-based, membrane-based, or cryogenic separators, because of the beneficial effects, in a first embodiment, of using a portion of the waste product that is generated in the third stage, from which the methane-rich product gas also flows, to regenerate adsorbent in the second stage, and to use a portion of the waste product that is generated in the second and third stages to regenerate adsorbent in the first stage. In that first embodiment, the second stage operates by temperature swing adsorption. In a second embodiment, the second stage operates by pressure swing adsorption, and is otherwise practically identical to the first embodiment. In a third embodiment, the functions of the first two stages of the second embodiment are combined. The corresponding advantages for the third embodiment are the result of using a portion of the waste product that is generated in its second stage to regenerate adsorbent in the first stage.

The present multi-stage adsorption system is especially well suited to applications where the feed gas contains at least about 40% methane and at least about 5% carbon dioxide, and amounts to at least about 10 standard cubic feet per minute.

2. Discussion of the Background

Typical applications include, inter alia, production of pipeline-grade or liquefied natural gas (LNG) from methane-bearing feed gas for the merchant gas market. The demand for fuels produced from relatively small sources is increasing. There now is a market for small-scale pipeline-grade or LNG production apparatus, e.g., less than 20,000 standard cubic feet per minute (scfm) using 379.4 scf per pound mole (i.e., about 34,000 normal cubic meters per hour ($Nm^3/h$) using 0.022412 $Nm^3$ per gram mole). This demand has been augmented by the growing enthusiasm for LNG as a fuel for commercial vehicles.

Methane-bearing feed gas is typically produced from a wide variety of sources. Those related to human activities include (along with the percentage of total methane emissions): Landfills (24.1%), Natural Gas Systems (23.1%), Enteric Fermentation (21.1%), Coal Mining (9.9%), Manure Management (7.2%), and Wastewater Treatment (6.8%), which account for 92.1% of the Total, which amounted to 556.7 (Tg $CO_2$ Eq.) 10,580,370 million SCF in 2004. Gob wells at coal mines account for most of the approximate 9.9% listed above [see: "Technical and Economic Assessment of Potential to Upgrade Gob Gas to Pipeline Quality," US EPA, Report No. 430-R-97-012 (1997), "Inventory of U.S. Greenhouse Gas Emissions and Sinks: 1990-2004," EPA 430-R-06-002, (2006); U.S. EPA and http://www.epa.gov/methane/sources.html (Sep. 3, 2007)].

In order to purify methane-bearing feed gas to meet pipeline standards requires removal of moisture, and in some cases, i.e., depending on the original composition, carbon dioxide, oxygen, and nitrogen. In contrast to pipeline-grade natural gas, LNG offers advantages for storage, as well as shipment, and it provides an environmentally favorable fuel for trucks and buses, though it requires expensive liquefaction equipment. Information regarding LNG including production, imports, exports, and uses may be found at the DOE website (http://www.eia.doe.gov/, (Sep. 3, 2007)).

LNG standards, however, are different from pipeline standards, and the separation requirements are significantly different. Example pipeline-grade and LNG standards are shown in Table 1. A typical commercial LNG separation train has a capacity of 3 million tons per year, about 700,000 lb/hr, or 270,000 scfm (or 440,000 $Nm^3/h$) (Klinkenbijl et al., "Gas Pre-Treatment and their Impact on Liquefaction Processes" paper presented at the Gas Processors Association Meeting, Nashville Tenn., (1999)). Hence, each typical train has a capacity of about 13× that of the largest capacity envisioned by the present process. Those plants use well-known process technology, viz., cryogenic distillation, which is described later. For several reasons, it is difficult to adapt that type of technology to produce LNG economically on a small scale, such as is pertinent here.

TABLE 1

Example Requirements for Natural Gas

| Component | Pipeline Specification | LNG Specification |
|---|---|---|
| $CO_2$ | <1 to 3 mol % | <50 ppmv |
| $H_2O$ | * | <0.5 ppmv |
| $H_2S$ | <0.25 grain/100 scf | <3.5 ppmv |
| Inerts: $N_2 + O_2 + CO_2$ | <4 mol % | <5.0 mol % |
| O2 | <0.1 to 0.3 mol % | <1.0 mol % |
| Suspended Solids | Nil | Nil |

* 4 to 7 lbs./1,000,000 scf = 0.0084 to 0.0147 mol % or 84 to 147 ppmv.

Several means are available for purification and liquefaction of methane-rich gas. Several such processes treat the methane-rich gas by first liquefying it. That means the mixture must be dry and relatively free of carbon dioxide, as listed in the first two rows of the LNG column in Table 1. Some of these means are: (1) Nitrogen Refrigeration Cycle (also called closed Brayton/Claude cycle), (2) Turboexpander at Gas Pressure prop, (3) Precooled Joule-Thomson (JT) Cycle, (4) Cascade Cycle, (5) Mixed-Refrigerant Cycle, (6) Open Cycle with Turboexpander/Claude Cycle, (7) Stirling Cycle (or Phillips Refrigerator), (8) Thermoacoustic Driver Orifice Pulse Tube Refrigerator, and (9) Liquid Nitrogen Open-Cycle Evaporation. Although these methods are useful for liquefaction, none is capable of purifying the methane-bearing feed gas on a continuous basis, however, so they will not be described in any detail. Most of these will fail to operate satisfactorily unless the purity constraints listed in Table 1 are met.

Known techniques for purification of methane-bearing feed gas (containing carbon dioxide, nitrogen, oxygen, and water vapor) comprise at least two sequential units: at least one to remove the bulk of carbon dioxide and water vapor from the other constituents, followed by at least one additional unit to split methane from nitrogen and oxygen. Alternatively, it is possible first to remove nitrogen and oxygen from the other constituents, followed by removing carbon dioxide and water vapor from methane. Frequently, one unit would perform each required separation sequentially, e.g., to separate water from the methane-bearing feed gas producing a first methane-rich intermediate stream, from which carbon dioxide could be removed, producing a second methane-rich intermediate stream, then oxygen from the remaining gas, producing a third methane-rich intermediate stream, and so on, to remove oxygen and nitrogen.

Generally, the known separation techniques fall into only a few general categories: cryogenic distillation including partial condensation via refrigeration (i.e., to collect carbon dioxide and/or water as a liquid or solid), absorption, i.e., of carbon dioxide and/or water using selective solvents, membranes that are selectively permeable to specific components, adsorption processes, and hybrid systems. Prior art related to these five categories is summarized below.

Cryogenic distillation (CD) is a potential method for purifying a methane-bearing feed gas, containing carbon dioxide, nitrogen, and oxygen. It turns out to be less than ideal for a number of reasons explained below. The normal boiling points of these components are: nitrogen (−196° C.), oxygen (−183° C.), methane (−162° C.), carbon dioxide (sublimes at −78° C.), and water vapor (100° C.). The spread of boiling points implies that, if much oxygen is present, a hazardous situation may arise since oxygen and methane may tend to be concentrated together, which would be a hazardous mixture. If there were little oxygen present, nitrogen could be removed safely (as the most volatile component). In addition, carbon dioxide and water vapor pose potential processing problems because they can solidify at the temperature at which methane liquefies, if their partial pressures are too high. Because CD involves contacting the liquid and vapor phases of the mixture to be separated, formation of the solid phases of carbon dioxide and/or water can physically disrupt the separation, i.e., block the flow of liquid and vapor in a distillation column. In addition, solidification may cause a problem in the cold-box heat exchanger, which partially cools the feed mixture to cryogenic conditions, or in the Joule-Thomson valve, which also contributes to cooling. Thus, the feed to a CD column is normally adjusted approximately to meet the carbon dioxide and water vapor standards for LNG (carbon dioxide=50 ppm (vol), water vapor=0.5 ppm (vol), as shown in Table 1). In addition, oxygen must be reduced to a level that is safe for processing in a CD column, which is considerably lower than the LNG requirement listed in Table 1, on account of its tendency to be enriched within the CD apparatus. With those constituents suitably removed, the remaining separation objective is that of methane from nitrogen.

The operation of cryogenic distillation involves partially or fully liquefying the feed gas, under pressure, at low temperatures (as mentioned earlier). Afterwards, the partially or fully condensed feed is fractionated in one or two columns. If the latter, they operate in parallel at different pressures, in order to separate the feed into a nitrogen-rich stream overhead and a methane-rich stream from the bottom. Cooling the incoming feed stream with the overhead nitrogen stream, causing the nitrogen to vaporize prior to being exhausted, can reduce refrigeration cost. To deliver an LNG product, the bottom methane-rich distillation product is delivered to a storage vessel for sales.

Numerous refrigerated distillation processes for separating gas mixtures are taught in the prior art. For example, Holmes et al. (U.S. Pat. No. 4,462,814) describe a process and apparatus for distillation in which an alkane, such as propane or butane, is added to the feed to allow operation with decreased pressures and elevated temperatures, but without solid $CO_2$ formation, i.e., well within the liquid-vapor phase envelope. It, however, is complex, which leads to high capital cost and is impractical to apply to smaller feed streams. Similarly, Potts et al., (U.S. Pat. No. 5,120,338) describe a method for separating a multi-component feed stream using distillation and a controlled freeze zone, different from the Holmes process in that solid carbon dioxide is allowed to form in a controlled manner. This solid is melted and incorporated into the liquid portion of a liquid phase product. A third gas phase is enriched in the most volatile component, methane, allowing its separation. By carefully controlling the conditions of solid formation, and gas-liquid distillation, the components may be separated into three streams. Similarly, Barclay, et al. (U.S. Pat. No. 6,082,133) describe a method for separating carbon dioxide from a mixture (such as biogas). Their idea is based on freezing the carbon dioxide on a refrigerated surface, then causing it to sublime into another gas stream. Their method involves the use of heat integration, such that the sublimed carbon dioxide is used to cool the feed gas, and even the heat of sublimation is partly captured. The primary limitations of these processes are their complexity and the associated capital costs. These are not particularly economical means for removing carbon dioxide. Many cryogenic distillation processes for treating natural gas are focused on nitrogen rejection, such as Oakey and Davis (U.S. Pat. No. 7,059,152).

Absorption also can be effective for splitting carbon dioxide and/or water vapor from methane-bearing feed gas. The range of available absorbents for carbon dioxide includes amines, caustic, and others. Those are generally prepared in aqueous solutions that react with carbon dioxide. Conversely, ethylene glycol is commonly used to physically absorb moisture from gas streams. Removal of methane from the remaining oxygen and nitrogen can be accomplished by lean oil absorption, which involves the absorption of methane in chilled hydrocarbon oil. Since methane is the major component in the mixture, this process is energy-intensive and expensive to operate. In addition, the equipment for this process tends to be expensive, on account of the refrigeration unit and ancillary heat exchangers.

Several independent absorbers and solvent regenerators or strippers are required for purifying the specified methane-bearing feed gas, because the absorbents are specialized. One absorber is needed to capture carbon dioxide, and subsequently another absorber is needed to dry the gas. Finally, a lean-oil absorber is needed to capture the methane, allowing oxygen and nitrogen to pass through. This sequence is necessary since the carbon dioxide absorbent solution does not remove water or methane to an appreciable extent, but rather may introduces additional water into the treated gas, which must subsequently be removed by the dryer. Likewise, the dryer does not remove methane to an appreciable extent. In addition, the carbon dioxide absorber, dryer, and lean-oil absorber units require solvent regenerators, i.e., in which the absorbent solutions are heated and contacted with a compatible gas in order to desorb or strip the absorbed component. Hence, to accomplish the necessary separations via absorption and solvent regeneration requires a total of at least six separation units. In addition to the disadvantage of complexity, the absorbents tend to decompose and to lose effectiveness, produce foam, or become viscous as time proceeds, due to adverse chemical reactions and due to absorption of dilute contaminants. Absorbents, which cannot be fully regenerated, continue to accumulate contaminants, eventually releasing some of the contaminants into the methane-rich product. Consequently, absorbents have the disadvantage of routinely requiring replenishment.

Adler et al. (U.S. Pat. No. 4,270,937) disclose a comprehensive gas separation process for a feed gas containing methane and carbon dioxide together with impurities or contaminants. The Adler process includes an initial liquid carbon dioxide absorption process, which also removes certain contaminants from the feed gas, along with a liquid carbon-dioxide-enriched bottom product of the process. Siwajek et al. (U.S. Pat. No. 5,842,357) describe a process based on absorption which they claim is able to produce methane of sufficient quality for liquefaction, though it does not remove much nitrogen. In order to recover sufficiently pure methane, e.g., to meet LNG standards, on account of the number of absorption and regeneration units, the energy intensity, and the absorbent replenishment cost, the capital and operating expenses are very high. Morrow (U.S. Pat. No. 6,607,585) presents another absorption-based process that removes heavy hydrocarbons, VOCs, carbon dioxide, and hydrogen sulfide.

Membrane separation processes are well known for removing carbon dioxide water vapor, and nitrogen from methane, by using membrane materials that exhibit selective permeation of those relative to methane. Such processes use membrane modules combined as stages to perform the separation, and they exhibit a tradeoff between the recovery and purity of the methane-rich product that is recovered, such that it is impossible with current membrane materials to attain both high purity and high recovery on a single-pass basis. Consequently, to attain high recovery at reasonable purity requires substantial recycle, and power input. For example, Baker et al., (U.S. Pat. No. 6,630,011 B1) describe a variety of processes, which employ two types of membranes. One process uses 3-membrane modules, and another uses 4-membrane module design, which separate nitrogen, methane, and carbon dioxide, plus several hydrocarbon species. The pressures range up to 1,000 psia, and the product quality attained is sufficient for pipelines, but not for LNG. Baker et al. (U.S. Pat. No. 6,579,341) shows a membrane-based process for treating LFG and other methane-rich gases prior to combustion. Membrane processes are expensive for applications such as this, having high purity constraints, on account of high equipment and power costs (largely due to recycle which is necessary to meet purity requirements), which are not feasible except for very low feed flow rates Cyclic adsorption processes for separating methane-bearing feed gas containing carbon dioxide, nitrogen, oxygen, and water vapor, include pressure swing adsorption (PSA) and temperature swing adsorption (TSA). For example, Dolan and Butwell (U.S. Pat. No. 6,444,012) show a PSA process for separation of nitrogen from natural gas that utilizes two separate PSA stages. The first contains a hydrocarbon-selective adsorbent (e.g., silica) and the second contains a nitrogen-selective adsorbent (e.g., ETS-4). The product stream from the first PSA stage contains a natural gas stream having reduced hydrocarbon content, and the product stream from the second PSA unit is a natural gas stream having a reduced nitrogen concentration. The product from the second PSA unit is used to desorb the hydrocarbons from the first PSA unit so as to recover the hydrocarbons in the product stream. That patent teaches that it was necessary, periodically, to heat the second PSA adsorbent in order to improve the capacity of the nitrogen-selective adsorbent to adsorb nitrogen. Thus, it is partially a TSA process, as well. Butwell, et al., (U.S. Pat. Nos. 6,315,817 and 6,497,750) show a PSA process for separation of nitrogen from natural gas that utilizes two separate PSA stages. The first stage contains a rate-based, nitrogen-selective adsorbent (e.g., CTS-1 or ETS-4) and the second stage contains an equilibrium-based hydrocarbon-selective adsorbent (e.g., 13× zeolite, carbon, or silica gel). The main product stream from the first PSA stage contains a methane-rich stream, i.e., having a reduced nitrogen concentration. The byproduct of the first stage, which is enriched in nitrogen relative to the feed, is treated by the second stage. The main product stream from the second PSA unit has reduced methane content relative to the byproduct from the first stage. The byproduct of the second stage is enriched in methane compared with the byproduct from the first stage, and it is recycled to the first stage. Those patents also teach that it was necessary, periodically, to heat the first PSA adsorbent in order to improve the capacity of the nitrogen-selective adsorbent to adsorb nitrogen. Thus, it is partially a TSA process, as well. Davis, et al. (U.S. Pat. No. 5,174,796) describe a process for purification of natural gas in which the nitrogen content of natural gas is reduced to pipeline quality using a PSA process in which a particular combination of steps in the cycle produces a product natural gas having a reduced nitrogen content, a nitrogen-rich stream, and a high heat content fuel gas stream. Reinhold et al. (U.S. Pat. No. 5,536,300), and Reinhold et al. (U.S. Pat. No. 5,792,239) suggest other means by which the nitrogen and carbon dioxide content of natural gas can be reduced to meet pipeline standards. Sircar et al. (U.S. Pat. No. 4,770,676) describe a PSA process for treatment of LFG, containing methane and 40 to 60% carbon dioxide, to obtain high Btu gas for combustion and, optionally, purified carbon dioxide for industrial applications. Hahn (U.S. Pat. No. 6,631,626 B1) shows an adsorption-based process, in which a nitrogen-selective adsorbent is employed, and a refrigeration cascade used for liquefying the methane-rich product. This patent also includes an allowance for pretreatment to remove undesirable components via compression and absorption with amine solution, refrigeration, or adsorption with disposable adsorbent or regenerable adsorbent.

Dolan and Mitariten (U.S. Patent Application No. US 20060191410 A1) suggests a two-stage process by which C3+ hydrocarbons, nitrogen, and/or carbon dioxide contained in natural gas can be reduced. That application teaches that a methane-containing vent stream can be extracted from the second stage to be used to purge the heavy hydrocarbon-rich gas in the first stage. Mitariten (U.S. Patent Application No. US 2007/0068386 A1) suggests a means by which water vapor, volatile organic compounds (VOCs), siloxanes, and carbon dioxide contained in landfill gas can be reduced. That application teaches that a vent stream that is substantially free of siloxanes can be extracted to be used as a fuel in a gas engine. Carbon dioxide and water vapor can be removed from gas mixtures by an adsorption system sometimes called a pre-purifier. This approach is most commonly applied to air, prior to cryogenic distillation. The feed air is compressed then passed first through a refrigerated dryer (to reduce the dew point temperature to about 40° F. (4° C.), and then through an adsorber where it is cleaned of high boiling impurities such as water vapor and carbon dioxide. In many cases, multiple adsorbent layers are used, including forms of zeolite and/or activated alumina. Such adsorbers can function either as PSA or TSA processes.

Several hybrid techniques that employ cooling along with a second type of separation device. For example, O'Brien et al. (U.S. Pat. No. 4,681,612) describe a cryogenic separation system that produces a fuel-grade methane product and the option of a carbon dioxide product. This approach relies on cryogenic distillation, in which the overhead product is enriched in methane. A selective membrane further purifies the methane from that product. Similarly, Lokhandwala (U.S. Pat. No. 5,647,227) teaches a process and apparatus by which a mixture of methane, nitrogen, and at least one other component (carbon dioxide) are separated. This process employs a cryogenic separation augmented by a membrane. Also using low temperature, Sweeney et al. (U.S. Pat. No. 5,570,582), Soffer et al. (U.S. Pat. No. 5,649,996), and Ojo et al. (U.S. Pat. No. 5,531,808) teach processes by which the operation of adsorption systems is augmented by operation at sub-ambient or cryogenic temperatures. These hybrid systems are complex and expensive, which limit their use. Forte (U.S. Pat. No. 5,321,952) showed a process for purification of natural gas in which the nitrogen content was reduced by a combination of absorption, purification, flashing, and reflux steps. Doshi and Dolan (U.S. Pat. No. 5,411,721) describe a process for the rejection of carbon dioxide from natural gas comprising a gas permeable membrane and a multiple bed pressure swing adsorption system to produce a methane-rich product having a desired concentration of carbon dioxide. The carbon dioxide-rich permeate stream from the membrane system is fed to the PSA unit and a stream essentially free of carbon dioxide gas from the PSA unit is compressed and blended with the retentate to form the mixed gas product. Another combination of a semi-permeable membrane and adsorber was suggested by Prasad, et al. (U.S. Pat. No. 5,116,396).

The usage of chemical additives along with vapor-liquid equilibrium represents another type of hybrid process. Abdelmalek et al. (U.S. Pat. No. 5,642,630), disclose a LFG separation process that claims production of high quality LNG, liquefied carbon dioxide, and compressed natural gas. The patent describes a four-stage compressor to generate pressures up to 1800 psia, as well as three flash drums, the use of chemical additives, and multiple recirculation loops to obtain the desired products. This system is complex and the related capital costs limit its usefulness. A related patent, using methanol as a chemical additive to separate carbon dioxide and methane from landfill gas was reported (Apffel, U.S. Pat. No. 4,675,035). Addition of methanol to the gas mixture during distillation decreases the temperature and pressure range at which solid carbon dioxide will form, allowing the distillation of methane to produce a higher purity product. Methanol can be separated from the carbon dioxide and recycled once the distillation process is complete. "Cold Methanol" separations, as they are called, are effective, but they do not scale well to smaller LFG sources because of the system complexity, capital costs, and operating costs associated with the combined absorption and distillation processing equipment.

The entire contents of each of the above-mentioned patents and references are hereby incorporated by reference, the same as if set forth in their entireties herein.

In view of the prior art, it is evident that there is a commercial need for a cost effective process for treating feed gas comprised of, at a minimum, methane, carbon dioxide, nitrogen, oxygen, and water vapor, into a methane-rich product that is suitable for liquefaction or distribution via pipeline. There also is a commercial need to provide a separation system that uses the waste product from one part of the system to effect regeneration of adsorbent in another part of the system, and thereby to improve the efficiency of the separation. There is a further commercial need to provide a separation system that achieves high product quality and excellent product recovery, but with the least possible complexity and lowest possible operating cost. It is to these needs that the present development is addressed.

BRIEF SUMMARY

Accordingly, one aspect of the present process is to provide a separation system that treats a feed gas comprised of, at a minimum, methane, carbon dioxide, nitrogen, oxygen, and water vapor, and produces enriched methane suitable for liquefaction or pipeline distribution, but that avoids the problems associated with conventional systems. Another aspect of the present process is to treat at least 10 scfm but less than 20,000 scfm of feed gas. Another aspect of the present process is to enable production to be safer and more cost effective than conventional systems, by using a sequence of cyclic adsorption stages in one system. Another aspect of the present process is to provide for the control of the delivery and quality of gas from each stage of the system, such that the final quality of the product gas is acceptable for liquefaction or pipeline distribution.

These and other aspects have been achieved by the present process, the first embodiment of which provides a separation system, which includes three-stages: a first stage that operates by pressure swing adsorption (PSA), a second stage that operates by temperature swing adsorption (TSA), and a third stage that operates by pressure swing adsorption (PSA). The second embodiment also includes three-stages, but, in this case, all three operate by PSA. A third embodiment of the present process employs two-stages: a first stage that operates by PSA, and a second stage that operates by PSA.

The goal of Stage 1 of the first embodiment, the second embodiment, and the third embodiment is bulk separation of carbon dioxide and water vapor from the feed gas, containing about: 45% to 60% methane, 5% to 40% carbon dioxide, 5% to 40% nitrogen, 0.5% to 5% oxygen, and 0.1% to 3% water vapor, producing a purified product stream containing mainly methane, nitrogen, oxygen, and small amounts of carbon dioxide and water vapor, e.g., about 0.1 to 5% carbon dioxide, and 0.001 to 0.1% water vapor. The goal of Stage 2 of the first embodiment and of the second embodiment is purification of the product stream from Stage 1, producing a purified product containing methane, nitrogen, and oxygen, by removing all but a trace of carbon dioxide and water, e.g., less than 35 ppm carbon dioxide and less than 0.35 ppm water vapor. The goal of Stage 3 of the first embodiment, the second embodiment, and of Stage 2 of the third embodiment is bulk separation of methane from nitrogen and oxygen, producing a final methane-rich product containing methane and meeting or exceeding the specifications listed in Table 1, with respect to nitrogen, oxygen, carbon dioxide, and water. Thus, in the third embodiment, the purposes of the first two stages of the first and second embodiments are combined. The goal of Stage 2 of the third embodiment is the same as that of Stage 3 for the other two embodiments, namely, bulk separation of methane from nitrogen and oxygen, producing a final methane-rich product containing methane and meeting or exceeding the specifications listed in Table 1, with respect to nitrogen, oxygen, carbon dioxide, and water.

In the third stage of either the first or second embodiments, or the second stage of the third embodiment, it is possible to vary the nitrogen and oxygen content of the methane-rich product by changing the operating conditions or the adsorbent.

For example, it is possible to obtain a methane-rich product having an oxygen content of approximately 0.1% to 1%, from a feed that originally exhibited an oxygen-to-methane ratio of about 4%. The higher value requires less power and somewhat smaller vessels. The purified methane stream is produced at ambient pressure, though it may be compressed to an arbitrary pressure.

BRIEF DESCRIPTION OF THE DRAWINGS

For a fuller understanding of the nature and advantages of the present process, reference should be had to the following detailed description taken in connection with the accompanying drawings, in which.

DETAILED DESCRIPTION

The operation of each stage will be described. All compositions, unless otherwise indicated are in molar percentages, designated by %, or molar parts per million, designated as ppm. Those units, respectively, are practically the same as volume percentages and volume ppm.

Pressure Swing Adsorption (PSA) for present purposes is a known process to the skilled artisan. It is a process by which a mixture consisting of one or more less-strongly adsorbed components and one or more more-strongly adsorbed component(s) can be separated, generally obtaining the less-strongly adsorbed component(s) as a purified product at high pressure, while the stream containing the more-strongly adsorbed component(s) is produced at a lower pressure, and at lower purity than the high pressure product. PSA typically comprehends subjecting adsorbent-filled columns, in which the adsorbent is stationary, to the sequential steps of feed, pressure equalization, blowdown, evacuation, purge, and re-pressurization, with these steps being iteratively repeated. The pressure equalization step may be replaced by a rinse step in order to obtain the more-strongly adsorbed component(s) at higher purity.

Temperature Swing Adsorption (TSA) for present purposes also is a known process to the skilled artisan and typically comprehends subjecting adsorbent-filled columns, in which the adsorbent is stationary, to the sequential stages of purging, cooling, feed, and heating, wherein the adsorbent temperature is cycled synchronously during uptake (feed) and release (heating and purging). Frequently, if the feed step is conducted at elevated pressure, the heating step will be preceded by blowdown, and repressurization will precede the cooling step. Such a cycle is a hybrid of PSA and TSA.

Figure 1:
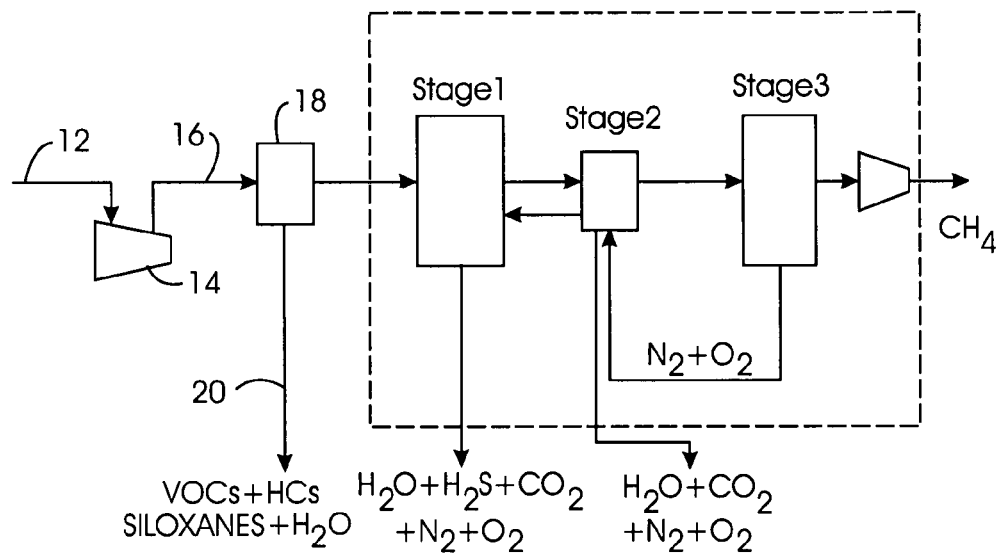
FIG. 1 is block-diagram of the first and second embodiments of the multi-stage adsorption system, both of which have three sequential adsorption stages.

Referring initially to FIG. 1, a methane-bearing feed gas, 12, is fed to a feed compressor, 14 to create the high-pressure of the pressure swing cycle, $P_H$. Pressurized feed gas, 16, is fed into a pretreatment stage, which may include devices for removing VOCs, siloxanes, hydrogen sulfide, and water, 18, to remove such constituents from the pressurized feed gas 16, those constituents are withdrawn as a waste stream, 20. The feed gas now is ready for admission to the inventive process, the first and second embodiments of which operate in three stages: a first stage, Stage 1, that operates by pressure swing adsorption (PSA); a second stage, Stage 2, that operates by temperature swing adsorption (TSA) in the first embodiment, or by pressure swing adsorption (PSA) in the second embodiment; and a third stage, Stage 3, that operates by pressure swing adsorption (PSA). Stage 2 of the third embodiment is practically identical to Stage 3 of embodiments 1 and 2.

Stage 1 of the first embodiment and second embodiment, shown in FIG. 1, is bulk separation of carbon dioxide and water vapor from the feed gas, producing a purified product stream containing mainly methane, nitrogen, oxygen, and small amounts of carbon dioxide and water vapor, e.g., about 0.1 to about 5% carbon dioxide, and about 0.001 to about 0.1% water vapor. The goal of Stage 2 of the first embodiment and second embodiment is purification of the product stream from Stage 1, producing a purified product containing methane, nitrogen, and oxygen, by removing all but a trace of carbon dioxide and water, e.g., less than about 35 ppm carbon dioxide and less than about 0.35 ppm water vapor, which is required to meet LNG standards listed in Table 1, pending removal of nitrogen and oxygen. This stage will be unnecessary if the purpose of the process is to produce a product gas that can meet pipeline quality standards. The goal of Stage 3 of the first embodiment and second embodiment, and of State 2 of the third embodiment, is bulk separation of methane from nitrogen and oxygen, producing a final methane-rich product containing methane and meeting or exceeding the specifications listed in Table 1, with respect to nitrogen, oxygen, carbon dioxide, and water, for either LNG or pipeline grade gas.

Figure 3:
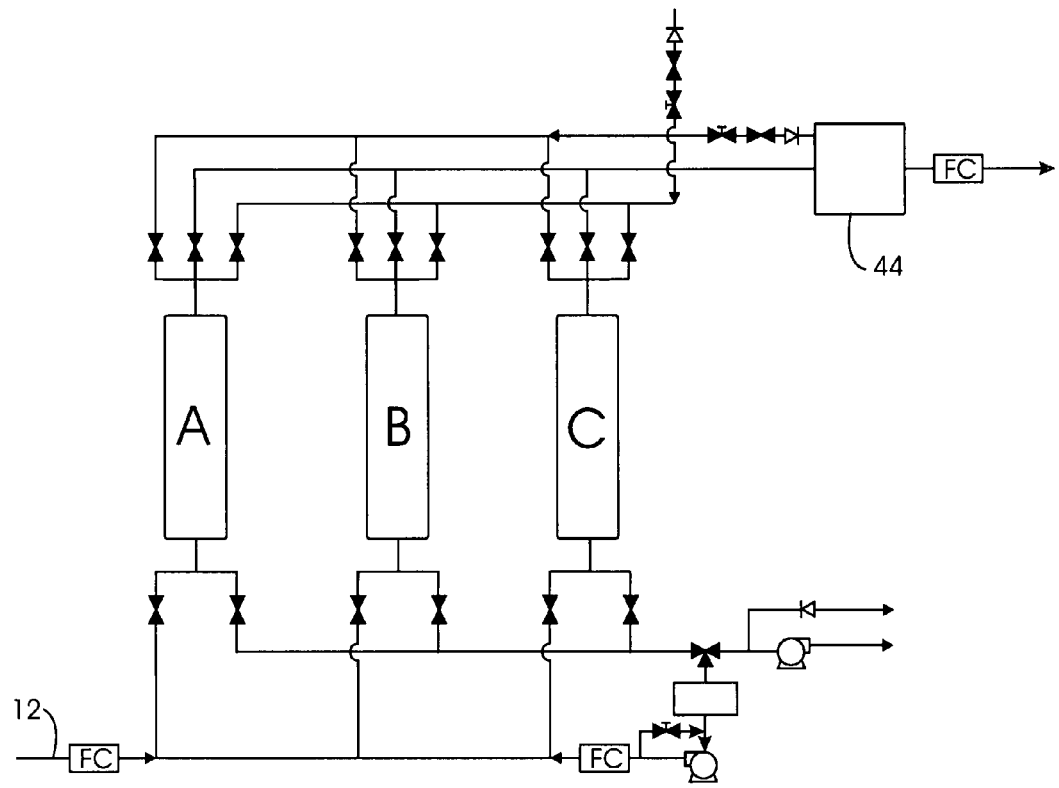
FIG. 3 is schematic diagram of Stage 1 of the first and second embodiment (FIG. 1) and of the third embodiment (FIG. 2) of the present process. It is also is an embodiment of Stage 2 of the second embodiment (FIG. 1). For all of these embodiments, the operating conditions and type of adsorbent, which fills the adsorbers (A, B, and C), may differ.

Stage 1 of the first embodiment and second embodiment comprises at least three parallel adsorption columns, A, B, and C, in which the adsorbent is stationary, interconnected as shown in FIG. 3. Valving, e.g., pneumatically operated valves, solenoid valves, 3-way valves, metering valves, check flow valves, flow controllers (FC), and like devices are provided in conventional fashion in order to accomplish the flow sequences, flow rates, pressures, etc., as described herein and illustrated in the accompanying drawings. Exemplary such devices are depicted in the drawings.

Figure 4:
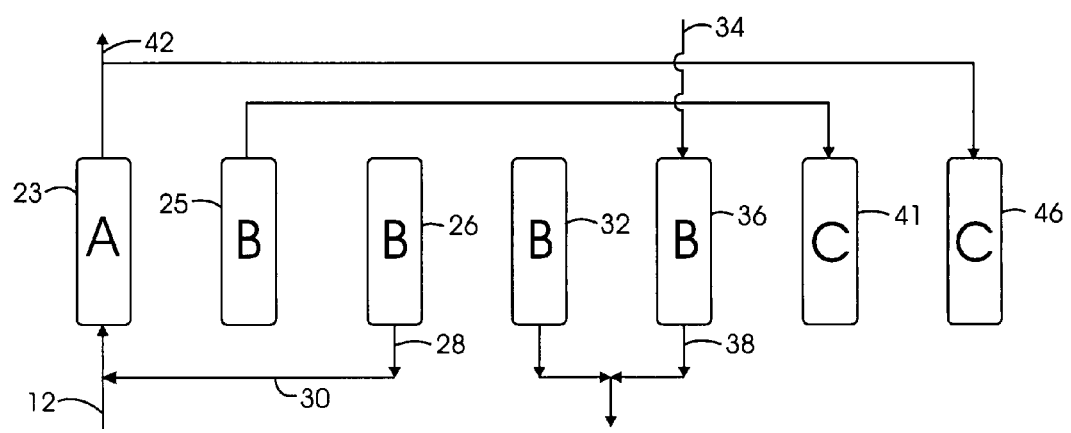
FIG. 4 is an embodiment of the operating sequence of Stage 1 of the first, second, and third embodiments (FIG. 1 and FIG. 2) of the present process, and it is an embodiment of the operating sequence of Stage 2 of the second embodiment (FIG. 1), of the present process.

Columns A, B, and C undergo a sequence of steps as shown in FIG. 4. The sequential states occurring in each column are denoted by numerical labels. Methane-bearing feed gas 12 at high-pressure $P_H$ of the pressure swing cycle is admitted to a first adsorption column, A, which undergoes a feed (or adsorption or uptake) step, shown as state 23. When breakthrough of the carbon dioxide or water vapor is imminent, the feed step in that column is stopped. The duration of this feed step is adjusted to ensure that the purified product contains about 0.1 to about 5% carbon dioxide, preferably about 0.5% to about 2% and less than about 20 ppm $H_2O$. Simultaneously, second adsorption column, B, undergoes a pressure equalization step, shown as state 25, with a third adsorption column, C, shown as state 41, in which the gas in second adsorption column B is released into third adsorption column C, which had been approximately at the low-pressure of the pressure swing cycle, $P_L$. Accordingly, the pressures in both columns B and C converge until they are nearly equal, i.e., at an intermediate pressure, $P_M$. Afterwards, second adsorption column, B, undergoes a countercurrent blowdown step, the first phase of regeneration, shown as state 26, to a lower pressure, $P_A$, in which gas escapes as a first byproduct, 28, and which has a composition similar to that of feed 12 and so may be recycled via line 30 and mixed with feed gas 12. Since $P_A$ is less than $P_H$, compression is required, though it is not shown in FIG. 4.

Subsequently, second adsorption column B is evacuated, the second phase of regeneration, as shown in state 32 via a vacuum pump (not shown in FIG. 4), approaching low-pressure $P_L$ of the pressure swing cycle. Then, a small amount of byproduct, 34, from Stage 2 and/or Stage 3 is introduced to the second adsorption column B, as shown in state 36 in order to purge the contents, the third phase of regeneration, while maintaining approximately low-pressure $P_L$ of the pressure swing cycle. The effluent from both the evacuation step 32 and purge step 36 is a second byproduct, 38, which is exhausted. As remarked previously, the third adsorption column, C, simultaneously undergoes a pressure equalization step, as shown in state 41, with the second adsorption column, B, in which the gas in second adsorption column B, which had been about at high-pressure $P_H$ of the pressure swing cycle, is released into third adsorption column C, originally at about the low-pressure $P_L$ of the pressure swing cycle. Subsequently, third adsorption column, C, is opened to the purified product line, 42, and associated surge tank, 44, as shown in FIG. 3, which enables third adsorption column, C, to be pressurized, as shown in state 46, with the purified product approximately to the high-pressure $P_H$ of the pressure swing cycle. After pressurization state 46, the cycle repeats, commencing at feed state 23.

All three columns in FIG. 3 operate synchronously, such that while first adsorption column A is being fed (state 23), second adsorption column B undergoes pressure equalization (state 25) with third adsorption column C, followed by countercurrent blowdown (state 26), evacuation (state 32), and purge (state 36). Likewise, simultaneously, the third adsorption column, C, undergoes pressure equalization (state 41) with second adsorption column B, followed by pressurization (state 46) with purified product. At the end of its feed step, state 23, first adsorption column A commences pressure equalization, as stated previously, along with second adsorption column B, and third adsorption column C commences its feed step. All four mentioned pressures, $P_H$, $P_M$, $P_A$, and $P_L$, are subject to optimization.

Modifications to the PSA process and cycle, shown in FIGS. 3 and 4, designed to improve the performance of the system or to reduce the energy requirement also may be envisioned. These alternative, modified PSA processes and cycles are encompassed within the scope of the present process.

Figure 2:
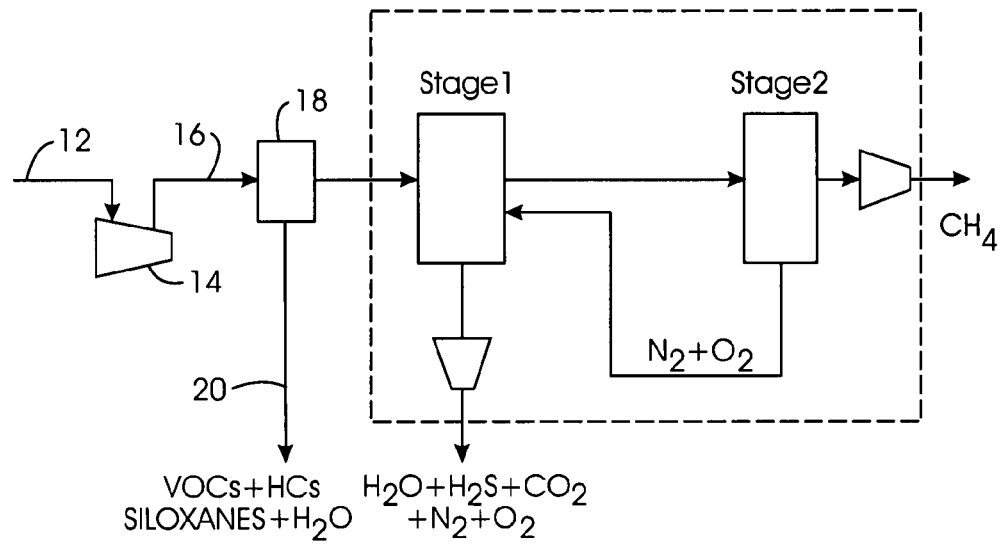
FIG. 2 is a third embodiment of the multi-stage adsorption system, which has two sequential adsorption stages.

Stage 1 of the third embodiment (FIG. 2) is practically identical to that described in the previous paragraphs for the first and second embodiments. The principal difference is the operating policy, required when the desired product must meet LNG standards as described in Table 1, which for the third embodiment must be much more restrictive. If the purpose is only to meet pipeline grade standards, listed in Table 1, then Stage 1 of the third embodiment may operate very much the same as for the first and second embodiments. In the former case, the duration of the feed step is adjusted to ensure that the purified product contains no more than about 35 ppm carbon dioxide, preferably less than about 30 ppm, and less than about 0.35 ppm water vapor.

Figure 5:
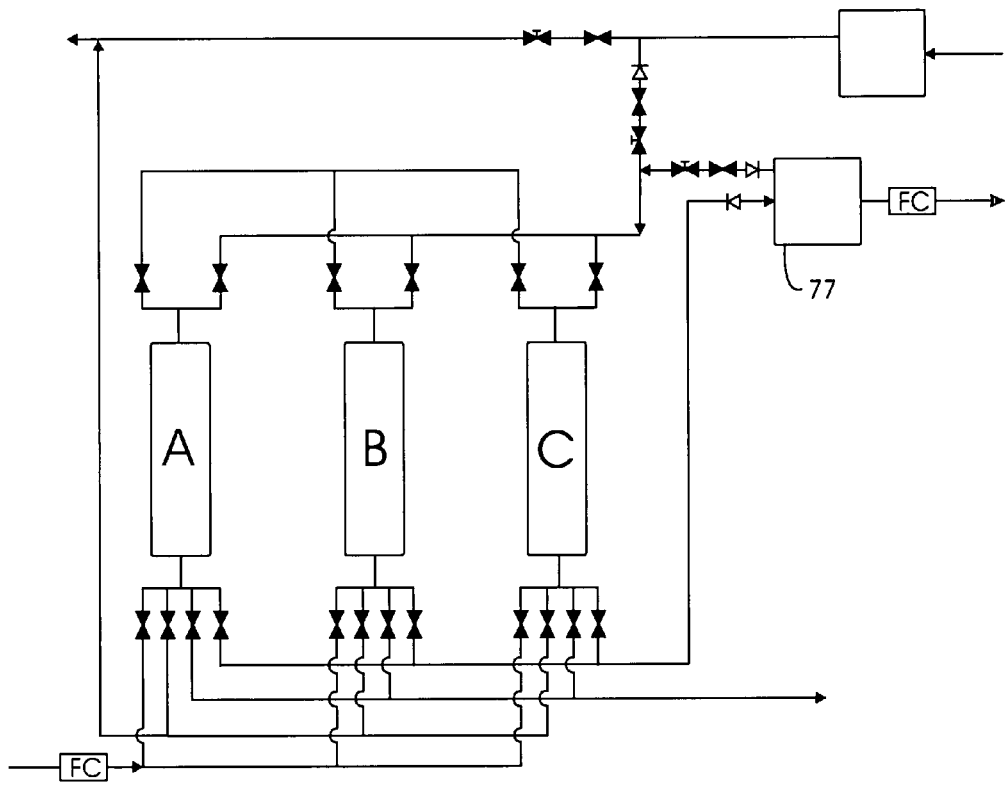
FIG. 5 is a schematic diagram of Stage 2 of the first embodiment (FIG. 1) of the present process.
Figure 6:
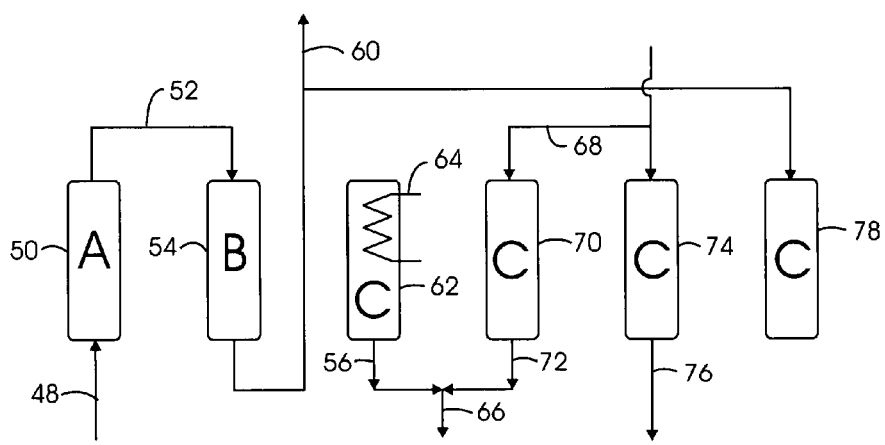
FIG. 6 is an embodiment of the operating sequence of Stage 2 of the first embodiment (FIG. 2) of the present process.

Stage 2 of the first embodiment and of the second embodiment is required to meet LNG standards listed in Table 1. Otherwise, if the objective is to meet pipeline grade specifications, then Stage 2 may be omitted. In the first embodiment, it comprises at least three parallel adsorption columns, A, B, and C, in which the adsorbent is stationary, which operate according to a combined pressure and temperature swing cycle. The adsorption columns are interconnected as shown in FIG. 5. The columns undergo a sequence of steps as shown in FIG. 6. Product gas from Stage 1, 48, at high-pressure of pressure swing cycle $P_H$ is admitted to the bottom of a first adsorption column A, which undergoes a feed (or adsorption or uptake) step, indicated as state 50. The effluent, 52, from the top of the first adsorption column A is directed to the top of second adsorption column B in order to effect partial cooling, shown as state 54, of second column B. When breakthrough of the carbon dioxide or water vapor is imminent in first adsorption column A, the feed step is stopped. The duration of feed step is adjusted to ensure that a purified product, 60, contains no more than about 35 ppm carbon dioxide, preferably about 20 ppm, and less than 0.35 ppm water vapor.

Next, third adsorption column C undergoes a countercurrent blowdown step, the first phase of regeneration, shown as state 62, in which gas escapes as a first byproduct, 56, and shifting to low-pressure of the cycle $P_L$. Heat is simultaneously or subsequently delivered to third adsorption column C via a heating element, e.g., via a heating coil, 64, suspended in the adsorbent, or via a plurality of u-tube, coil, or parallel-plate heating elements that are distributed in adsorption column C so as not to impede flow, the second phase of regeneration. The heat transfer surface is in contact with adsorbent predominately in the top half of column C. As the adsorbent is heated, first in the top section of column C via conduction, the carbon dioxide and water vapor will desorb. That gas or vapor is allowed to flow from the bottom of adsorption column C, with minimal resistance, at low-pressure $P_L$ of the cycle. That gas constitutes a first portion of the first byproduct, 56. The temperature reached during heating and the duration of heating are subject to optimization. Those parameters depend on the nature of the heating element, the operating conditions (e.g., of the feed, such as the flow rate, temperature, pressure, and the carbon dioxide and water vapor content), the working capacity, thermal conductivity, and heat capacity of the adsorbent, energy cost, and the dimensions of the adsorption columns.

Subsequently, purge gas, 68, delivered from Stage 3, in first purge step, shown as state 70, the third phase of regeneration, is admitted to the top of third adsorption column C, which causes cooling near the top of the column and convection of heat from the top of the column towards the bottom of the column. The resulting effluent, 72, which contains substantial carbon dioxide and water vapor, comprises a second portion of first byproduct, now combined with 56 to form 66, which is exhausted as waste. The second portion of the resulting purge effluent, shown as state 74, is a second byproduct, 76, which contains less carbon dioxide, and so it is retained for use in Stage 1, as shown in FIGS. 1, 5, and 6. Purging continues to effect partial cooling of third column C, the fourth phase of regeneration. Subsequently, third adsorption column C is opened to the purified product line and associated product surge tank, 77, as shown in FIG. 5, and the pressure in the first adsorption column is increased, as shown in state 78 to high-pressure of the cycle $P_H$. After this pressurization step, 78, is finished, the role of column A is undertaken by column B, and that of column B is undertaken by column C, and column A commences the role of column C. Both mentioned pressures, $P_H$ and $P_L$, are subject to optimization.

Figure 7:
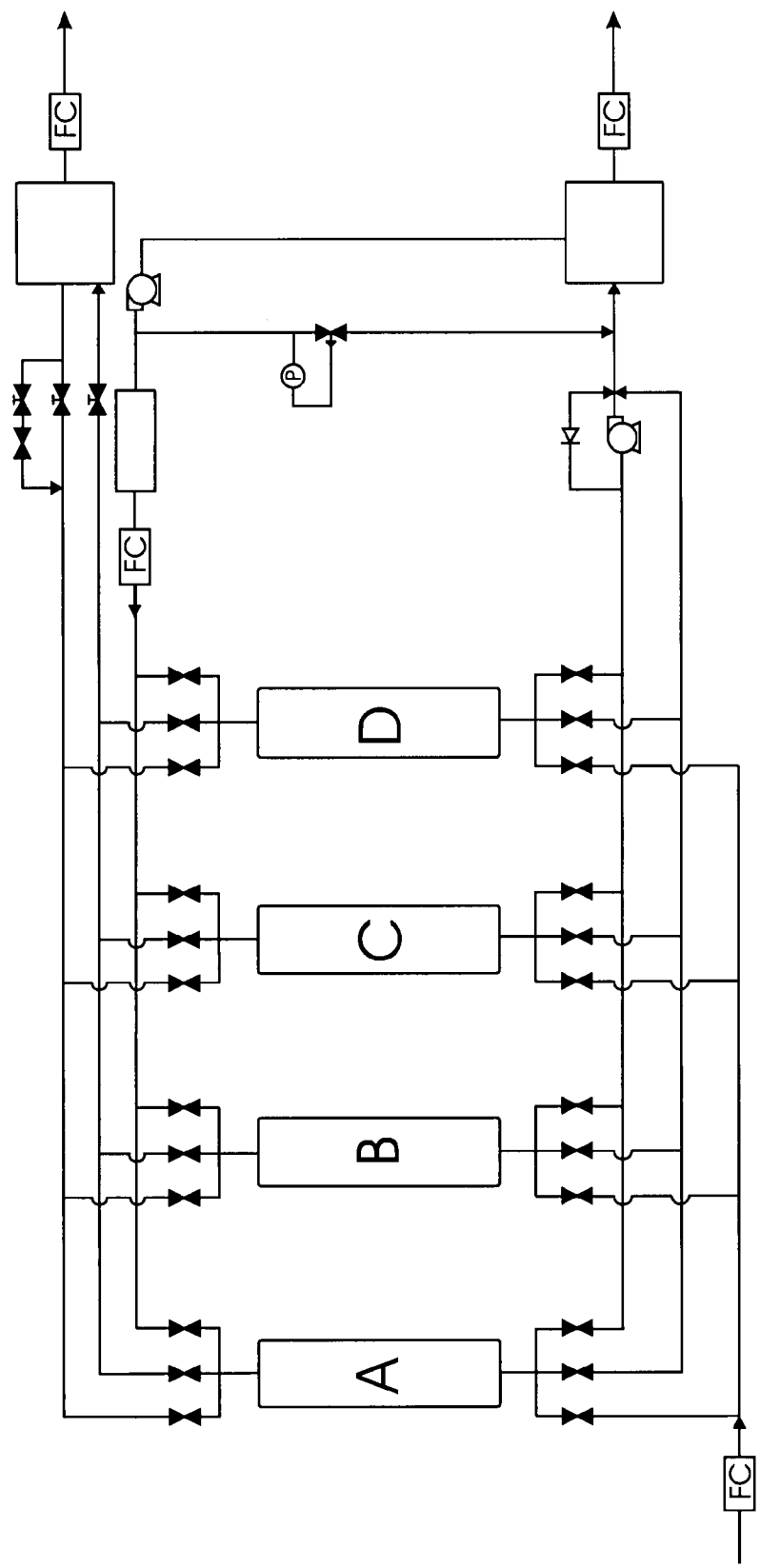
FIG. 7 is a schematic diagram of Stage 3 of the first embodiment and the second embodiment (FIG. 1) of the present process, which is practically identical to Stage 2 of the third embodiment (FIG. 2) of the present process.
Figure 8:
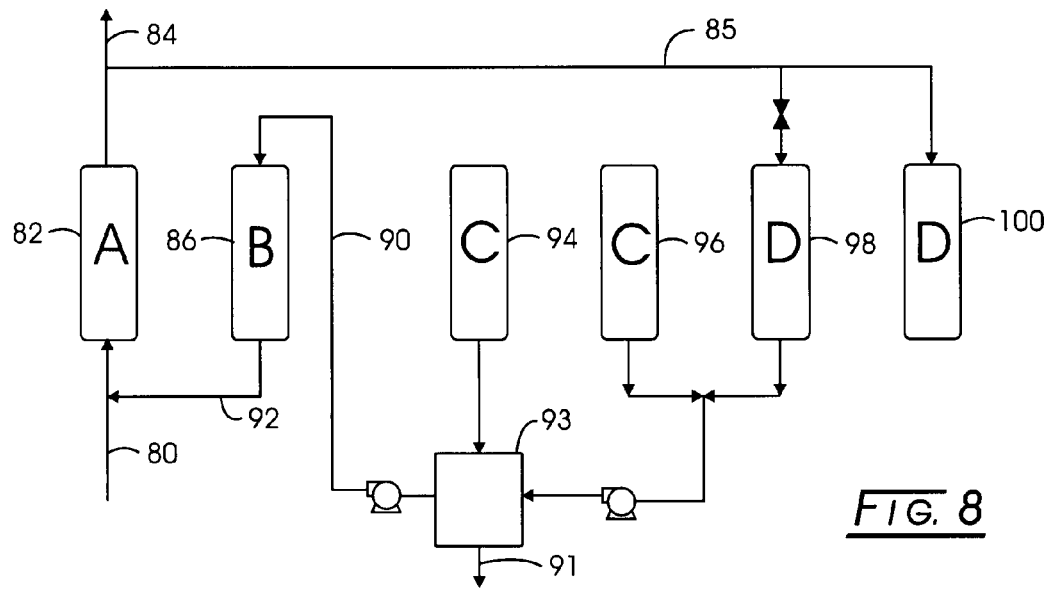
FIG. 8 is an embodiment of the operating sequence of Stage 3 of the first embodiment (FIG. 1) and the second embodiment (FIG. 2) of the present process, which is practically identical to Stage 2 of the third embodiment (FIG. 2) of the present process.

Stage 3 of the first embodiment and of the second embodiment comprises at least three parallel adsorption columns, or alternatively four columns in which the adsorbent is stationary. The latter case, in which the columns are labeled A, B, C, and D, and are interconnected, is shown in FIG. 7. The columns undergo a sequence of steps as shown in FIG. 8. Purified product, 80, of Stage 2, which is sufficiently free of carbon dioxide and water vapor, comprises the feed to this stage. Purified product 80 consists mainly of methane, nitrogen, and oxygen. It is admitted at high-pressure of the pressure swing cycle $P_H$ to the bottom of first adsorption column A. That column has been pressurized in a preceding step, to be described later, with the so-called light product, which is generally a mixture of mainly nitrogen and oxygen. Admitting feed gas commences a feed (or adsorption or uptake) step, shown as state 82, producing the so-called light product, 84, at the top of first adsorption column A. When breakthrough of the methane is imminent, the feed step 82 is stopped. Specifically, the duration of feed step 82 is adjusted to ensure that the produced mixture of mainly nitrogen and oxygen contains about 0.1 to about 15% methane, preferably about 0.2% to about 5%.

Simultaneously, second adsorption column B undergoes a rinse step, shown as state 86, in which the recycled part of the so-called heavy product, 90, i.e., a methane-rich product gas, is admitted to the top of the adsorption column B. That stream 90 is at a pressure slightly higher than the high-pressure of pressure swing cycle $P_H$. During step 86, a mixture, 92, that comprises mainly methane, nitrogen, and oxygen, similar to the feed gas, is exhausted from the bottom of column B. That effluent 92 is mixed with feed gas 80 being delivered to first adsorption column A.

When breakthrough of the methane is complete, the rinse step, shown as state 86, is stopped. Specifically, the duration of rinse step 86 is adjusted to ensure that the last portion of gas produced from the bottom of the second adsorption column contains about 70 to about 99% methane, preferably more than about 90%. It will be obvious to one skilled in the art that the flow direction of streams 90 and 92 could be reversed, such that flow is upwards in step 86, without materially affecting the performance or purpose of this rinse step. Simultaneously, the pressure in third adsorption column C is permitted to drop, in the countercurrent blowdown step, the first phase of regeneration, shown as state 94, e.g., to an intermediate pressure of the pressure swing cycle, $P_M$, by releasing gas through the bottom of column C. Subsequently, third adsorption column C is evacuated, shown as state 96, the second phase of regeneration, via a vacuum pump, approaching the low-pressure of the pressure swing cycle, $P_L$.

Next, a small amount of the aforementioned light product 85, mainly nitrogen and oxygen, which was produced during feed step, shown as state 82, is introduced to the top of the fourth adsorption column D to purge the contents of column D, the third phase of regeneration, shown as state 98. The effluent gas collected during this step is combined in unit 93 with the gas produced during the preceding countercurrent blowdown step, shown as state 94, and evacuation step, shown as state 96, and collectively referred to as heavy product. The recycled part of that heavy product, 90, is used during rinse step 86 and part 91, is taken out of the process as the net heavy product. As mentioned earlier, heavy product, comprising both 90 and 91, is a methane-rich product gas that meets certain purity requirements, e.g., for liquefaction or pipeline grade. The adjective, heavy, connotes the fact that for many adsorbents, methane is more strongly adsorbed relative to nitrogen and oxygen, which comprise the majority of light product 84, this is despite the fact that the so-called heavy gas is less dense under equal conditions than the so-called light gas or light product. The portion of heavy product 90 is compressed to a pressure slightly higher than the high-pressure of the pressure swing cycle, $P_H$, in order to be used in rinse step 86, described earlier. Finally, a sufficient quantity of the light product, 84, of mainly nitrogen and oxygen, which was produced during feed step 82, is introduced to the top of the fourth adsorption column, D, to pressurize the column to the high-pressure of the pressure swing cycle, $P_H$, as shown in state 100. This completes the sequence of steps for the columns, which repeats indefinitely, or until maintenance is required. All three mentioned pressures, $P_H$, $P_M$, and $P_L$ are subject to optimization.

Stage 2 of the second embodiment is similar in form and function to Stage 1 of the first and second embodiments. That is, it comprises at least three parallel adsorption columns, A, B, and C, in which the adsorbent is stationary, interconnected as shown in FIG. 3. The columns undergo a sequence of steps as shown in FIG. 4. The purified product of Stage 1, which is dilute in carbon dioxide and water vapor, comprises the feed to this stage. The light product, again, is rich in methane, nitrogen, and oxygen. The heavy product is a carbon dioxide-rich product gas that is either exhausted or retained for purging Stage 1 of the second embodiment.

Stage 2 of the third embodiment is practically identical in form and function to Stage 3 of the first and second embodiments. That is, it comprises at least three parallel adsorption columns, or alternatively four, in which the adsorbent is stationary, interconnected as shown in FIG. 7. The columns undergo a sequence of steps as shown in FIG. 8. The purified product of Stage 1 of the third embodiment, which is suitably free of carbon dioxide and water vapor, comprises the feed to Stage 2. The light product of Stage 2 is rich in nitrogen and oxygen. The heavy product of Stage 2 of the third embodiment is a methane-rich product gas that meets certain purity requirements, e.g., for liquefaction or distribution via pipeline.

EXAMPLES

Unless explicitly stated otherwise, compositions that follow are listed in volumetric percentages, and the abbreviated unit ppm refers to parts-per-million by volume. Pressures are given in pounds per square inch, absolute, abbreviated as psia. Flow rates are listed as standard cubic feet per minute, abbreviated scfm, in this case 1 pound mole is equivalent to 379.4 standard cubic feet (scf).

First Embodiment

Stage 1: Methane-bearing feed containing about: 52% methane, 34% carbon dioxide, 12% nitrogen, 2% oxygen, and 0.1% water vapor was separated using silica gel as the adsorbent in Stage 1. The maximum pressure, $P_H$, was about 70 psia, the minimum pressure, $P_L$, was about 0.8 psia, and the intermediate pressure, $P_A$, was about 16 psia, while the intermediate pressure, $P_M$, was about 35 psia. The effluent composition of the purified product was about 74% methane, 0.3% carbon dioxide, 23% nitrogen, 3% oxygen, and 0% water vapor. The corresponding time for each of the step is subject to optimization, and depends on the adsorbent, operating conditions, and vessel dimensions. Examples for this case are: 330 seconds for feed, 30 seconds for pressure equalization, 30 seconds for countercurrent blowdown, 160 seconds for evacuation, and 110 seconds for purge, 30 seconds for pressure equalization, and 300 seconds for pressurization. The net feed flow rate, per unit mass of adsorbent, was 0.0590 scfm/lb, not including the recycled byproduct, which was 0.0081 scfm/lb. The corresponding purified product flow rate was about 0.0393 scfm/lb. This stage represents Stage 1 of embodiments 1, 2, or 3.

Stage 2: The gas mixture produced by the Stage 1 was separated using zeolite 4A as the adsorbent in the second stage, and its flow rate, per unit mass of adsorbent, was 0.0356 scfm/lb. The maximum pressure, $P_H$, was about 70 psia, and the minimum pressure, $P_L$, was about 14.5 psia. Since this stage operated by PSA, it represents stage 2 of the second embodiment. The effluent composition of the purified product was about 74% methane, 0.0% carbon dioxide, 23% nitrogen, 3% oxygen, and 0% water vapor. The corresponding times for each of the steps are subject to optimization, and depend on the adsorbent, operating conditions, and vessel dimensions. Examples for this case are: 240 min for feed, 60 min for countercurrent blowdown and heating, 30 min for purging while heating, 149 min for cool purging, 1 min for pressurization, and 240 min for countercurrent cooling with purified product. The net feed flow rate, per unit mass of adsorbent, was 0.0590 scfm/lb, not including the recycled byproduct, which was 0.0081 scfm/lb. The corresponding purified product flow rate was about 0.0393 scfm/lb.

Stage 3: The purified product from the second stage was separated using activated carbon as the adsorbent in the third stage, and its flow rate, per unit mass of adsorbent, was 0.092 scfm/lb. The maximum pressure, $P_H$, was about 54 psia; the intermediate pressure, $P_M$, was about 14.5 psia; and the minimum pressure, $P_L$, was about 1 psia. The effluent composition of the purified heavy product was about 95% methane, 0% carbon dioxide, 4% nitrogen, 1% oxygen, and 0% water vapor.

The purified heavy product flow rate was about 0.074 scfm/lb. The effluent composition of the purified light product was about 0.2% methane, 0% carbon dioxide, 86% nitrogen, 14% oxygen, and 0% water vapor. The purified heavy product flow rate was about 0.018 scfm/lb. The corresponding times for each of the steps are subject to optimization, and depend on the adsorbent, operating conditions, and vessel dimensions. For the flow rates and compositions listed above, the times were: 62 seconds for feed, 62 seconds for rinse, 7 seconds for countercurrent blowdown, 80 seconds for evacuation, 7 seconds for purging, and 80 seconds for pressurization with purified product. This stage represents Stage 3 of embodiments 1 or 2, and Stage 2 of embodiment 3.

Adsorbent Selection

"Adsorbent" for present purposes comprehends a porous solid, particulate material or mixture of materials, such as those adsorbents discussed infra, which selectively admits and retains within its pores (or adsorbs) one or more components from a mixture containing at least one other component. The mixture in this case is a process gas. While the term "adsorbent" will be used often for convenience of description, a porous solid, particulate material, often ranging in size from about 0.1 mm to about 5 mm is meant and should be understood by the skilled artisan. Too, use of the term "particulate adsorbent" or "solid adsorbent" also refers to "adsorbent", as defined herein.

The most important attributes of an adsorbent for any application are: working capacity (change in loading of the desired strongly adsorbed component(s) between the uptake or adsorption step and the desorption or regeneration step (which occurs in three or more phases, as remarked previously), as shown in FIGS. 4, 6, and 8), selectivity (ability to adsorb the desired strongly adsorbed component(s) and not to adsorb other components that are not desired), kinetics (speed of uptake and release of the desired strongly adsorbed component(s)), durability (ability to withstand the stresses of cyclic adsorption over many PSA or TSA cycles), compatibility (suitable inertness, i.e., resistance to degradation or poisoning by contaminants in the feed mixture, and to decomposition of those or other contaminants), and cost (i.e., suitably low in order that the entire process is economical). The overall performance and economic benefits of the process depend on all of these.

Several adsorbents are potential candidates for Stages 1, 2, and 3 of embodiments 1 and 2, and Stages 1 and 2 of embodiment 3. For example, some types of molecular sieve, activated alumina, silica gel, and activated carbon are plausible choices, according to the characteristics listed above, but depending on the product specifications, and the operating conditions for a specific application.

PREFERRED EMBODIMENTS

Various other objects, features and attendant advantages of the present process will be more fully appreciated as the same becomes better understood from the following detailed description of the preferred embodiments of the process.

Preferably, according to one embodiment of the present process, a multi-stage adsorption system to purify a methane-bearing feed gas, comprising a plurality of components, including methane, carbon dioxide, nitrogen, oxygen, and water vapor. Other components may be present in small quantities in the methane-bearing feed gas, such as ethane, ethylene, hydrogen sulfide, and propane, with no significant impact on the operation of the present process. The purpose is to produce a methane-rich product gas that meets certain purity requirements, e.g., for liquefaction or for meeting pipeline specifications, and a byproduct gas comprising carbon dioxide, nitrogen, oxygen, water, and a small amount of methane.

One specific purpose of the present process is to purify landfill gas (LFG) in order to meet pipeline standards or the requirements for liquefaction, e.g., to produce liquefied natural gas (LNG). By its nature, LFG varies depending on the location, age, contents, season, and other variables of the source landfill. For example, there are landfills having flow rates of 10 standard cubic feet per minute (scfm) to more than 20,000 scfm (i.e., 34,000 standard cubic meters per hour ($Nm^3/h$)). LFG commonly contains methane from about 40% to about 70%, carbon dioxide from about 20% to about 50%, nitrogen from about 2% to about 20%, and is typically saturated with water vapor. In many situations, oxygen is present from about 0.1% to about 5%. This process focuses on rejection of carbon dioxide and water, which solidify at high pressure and low temperature encountered during liquefaction, and of oxygen and nitrogen, on account of industrial standards. In addition, many other minor components may be present in the LFG, such as ethane, propane, and heavier hydrocarbons, hydrogen sulfide, mercaptans, refrigerants, and siloxanes. Although those may impede the performance of the present process, were they to appear in the LFG, they are presumed to be mostly removed in upstream pretreatment equipment, so as not to pose a problem for the present process. However, hydrogen sulfide, propane refrigerants, and hydrocarbons (such as propane through butane), if present, will be mostly removed by this invention, i.e., as are carbon dioxide and water, and therefore they will not appear in the purified methane-rich product. Conversely, ethane, if it is present, will be only partly removed, i.e., will also be present in the purified methane-rich product. In addition, heavier hydrocarbons and siloxanes will be removed by the present invention, but the degree of regeneration will likely be low. So, their presence can only be tolerated for short periods (i.e., a few days).

A second specific purpose of the present process is to purify gob gas, also to meet the requirements for liquefaction or to meet pipeline standards. Gob gas commonly contains: methane from about 65% to about 85%, carbon dioxide from about 3% to about 9%, nitrogen from about 9% to about 26%, oxygen from about 2% to about 6%, and approximately saturated with water vapor [see: "Technical and Economic Assessment of Potential to Upgrade Gob Gas to Pipeline Quality," US EPA, Report No. 430-R-97-012 (1997)]. For example, there are gob gas sources having flow rates of 2,000 scfm to more than 6,000 scfm (i.e., 3,500 $Nm^3/h$). As can be seen, the composition and flow rate ranges are similar to LFG, though gob gas is potentially richer in methane and more dilute in carbon dioxide. Other diverse sources of methane-bearing feed gas, containing carbon dioxide, nitrogen, oxygen, and water vapor, are also considered within the scope of applications for the present process.

The adsorption system offers significant advantages compared with independent adsorption or membrane-based systems, operating as the identified stages, on account of the synergistic effects made possible by making maximum use of the waste products from the individual stages. The adsorption system also offers economic advantages compared with cryogenic distillation, which would generally not be practical for flow rates as small as for the present scale of operation.

The present multi-stage adsorption system is especially well suited to applications where the methane-bearing feed gas contains at least about 5% carbon dioxide, and amounts to at least about 10 scfm.

Preferably, the adsorption vessels of present process include immobilized beds at least one type of adsorbent, but possibly comprises two or three layers comprising different types of adsorbent. The shape of the adsorbent particles is preferably spherical beads, cylindrical pellets, or granules. The adsorbent could alternatively be provided in the form of a monolith, or solid structure comprising one or more helically coiled thin solid sheets, or multiple flat intersecting thin solid sheets, arranged so as to allow flow between the sheets.

Preferably, the present process is carried out with pretreatment of the feed to the system for the removal of at least a portion of the water vapor, e.g., to reduce the relative humidity of the methane-bearing feed gas to about 50% or less. In addition, certain contaminants would be advantageously removed, including silicon-bearing compounds (such as siloxanes), hydrocarbons (such pentane, hexane, benzene, toluene, xylenes, and the like) having molecular weights greater than 60 g/mole.

Another preferred embodiment of the present process provides that mixtures of methane and oxygen are never close to the flammability limits or explosive range, in order to promote safety. The present process preferably employs control of the adsorption vessels to prevent flammable mixtures from occurring. The exact values for the upper explosive limit (U.E.L) and lower explosive limit (L.E.L) for methane vary according to the concentration of other bulk components such as oxygen, carbon dioxide, and nitrogen, but for most purposes, the flammable range of about 5% to 15% in air is recognized, and is the basis upon which methane gas control levels have been set. Accordingly, the oxygen content of the internal streams shall always be less than about 10%, whenever the methane concentration exceeds about 5%.

Another preferred embodiment of the present process is that the adsorption vessels of each stage are provided with one or more temperature sensors. Those will provide an indication of the operating temperature, the shifts that occur within the adsorption vessels during operation, and provide a means to determine the consistency among the adsorption vessels during operation.

The present process preferably operates at a pressure regime where suitable compression and evacuation equipment is commercially-available and relatively inexpensive.

Preferably, the adsorption vessels of the second stage of the first embodiment include an insulation assembly. The insulation assembly may be constructed from one or more layers of insulation materials, internal or external, and may be either rigid or flexible. The precise amount, position, and type of insulation employed is dependent upon a variety of factors such as allowable heat loss, cost of energy, maximum surface temperature of the outer housing and the mode of structural support for the adsorber vessel. These variables do not materially affect the performance advantages of the adsorber vessels of the present process, and any numbers of possible insulation configurations are considered within the scope of the present process.

Several surprising and unexpected advantages of the present process are apparent when it is compared to the conventional systems.

The first advantage is the simplification in the construction of the separation system afforded, in the first and second embodiments, by combining the bulk removal of water vapor and carbon dioxide in Stage 1 of the system, by combining the final removal of water vapor and carbon dioxide in Stage 2 of the system, and by combining the separation of methane from oxygen and nitrogen in Stage 3 of the system. This eliminates the requirement for separate vessels, valves, fittings, and interconnecting plumbing, which are required in other conventional processes, each handling the removal of one component. This reduction in physical components and interconnections can greatly reduce the cost of the completed system.

The corresponding advantage in the third embodiment is afforded by combining the bulk and final removal of water vapor and carbon dioxide in Stage 1 of the system, and by combining the separation of methane from oxygen and nitrogen in Stage 2 of the system. This eliminates the requirement for separate vessels, valves, fittings, and interconnecting plumbing, which are required in other conventional processes, each handling the removal of one component. This further reduction in physical components and interconnections can greatly reduce the cost of the completed system, and is subject to economic optimization.

A second advantage in the first and second embodiments is the use of a portion of the byproduct from Stage 3 for partial regeneration of the adsorbent in Stage 2, and the use of a portion of the byproduct from Stage 3 along with a portion of the byproduct from Stage 2 for regeneration of the adsorbent in Stage 1. These features of the present process, when compared to the unit process approach of the conventional systems, allow greater efficiency in terms of methane recovery (or yield) and low energy consumption.

Figure 9:
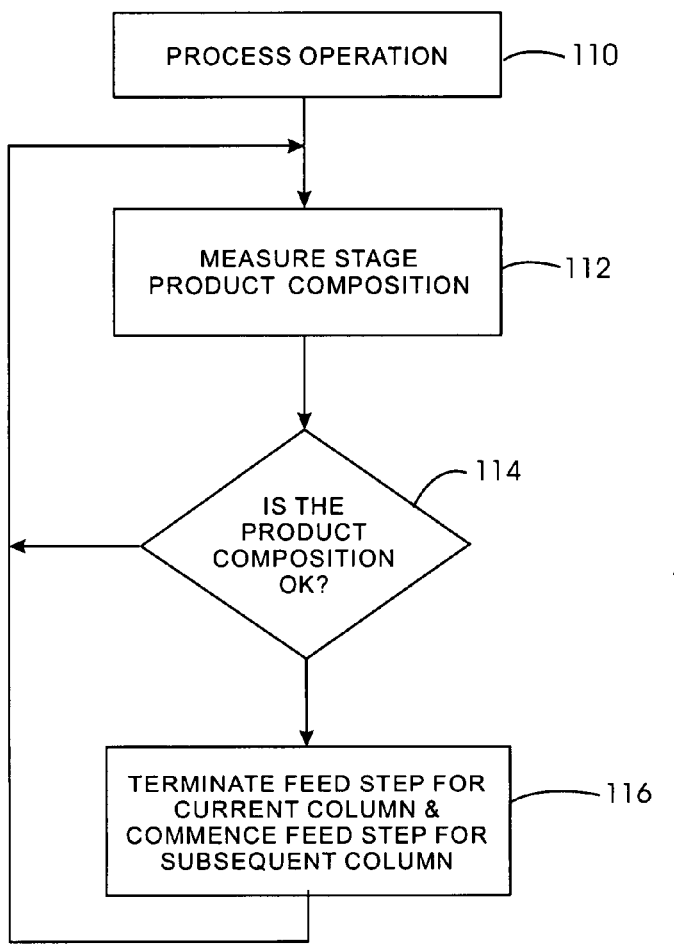
FIG. 9 is a logic diagram for a preferred control algorithm for each stage the first or second or third embodiments of the present process. The drawings will be described in further detail below.

The measurement of Stage Product Composition may be accomplished by any of several means that are known to one skilled in the art of gas processing. Direct analytical methods include, inter alia, infrared spectroscopy, mass spectrometry, flame ionization detection, and others. In addition, inferential means may be employed to detect composition, such as, for example, temperature or electrical capacitance of the adsorbent. Since adjustment of the feed step duration of all the adsorption vessels, at each stage, is critical to the production of products having adequate purity, as well as to the obtaining of acceptable recovery (or yield), such measurement is very important. Referring to FIG. 9, the preferred embodiment of the control scheme for the adsorption system is shown. The control scheme for the Process Operation, 110, employs a minimum of one composition measurement, 112, per stage. Due to the nature of adsorption in which the adsorbent is stationary, there is a phenomenon known as breakthrough, which occurs during the feed step of an adsorption cycle when the amount of feed admitted exceeds the working capacity of the adsorbent. To maintain suitable product quality, it is desirable to stop the feed step for each column in a repeatable manner that maintains the quality of the product. To do that requires periodic measurements of the product quality. The composition measurement may be indirect, such that another property is measured, as mentioned above, and the composition is inferred from that property. As shown at step 114, if the direct or inferential composition measurement indicates that the product quality is acceptable, the feed step is permitted to continue, and composition measurements continue. Conversely, when the composition measurement indicates that the product quality is dropping or is imminently unacceptable, the feed step is terminated. The direct or inferential composition measurements at these points are preferably measured at repeated frequent intervals, in order to adjust the duration of the feed step in the respective stage, and the new value of the step duration is compared to the previous value, and only a limited change is permitted. This will prevent an upset, in case of a spurious measurement, and will prevent unstable operation, should transients exist in the feed gas supply. When the target has been reached, the feed step is terminated, 116.

Other control strategies, which achieve the twin aims of maintaining adequate purity and high recovery (or yield) of the methane-rich product gas, will be apparent to one skilled in the art. Modifications to the control strategy of FIG. 9, designed to improve the response of the system or to reduce oscillations about the cyclic steady-state condition may also be envisioned. These alternative, modified control strategies are encompassed within the scope of the present process.

While the process has been described with reference to preferred embodiments, those skilled in the art will understand that various changes may be made and equivalents may be substituted for elements thereof without departing from the scope of the process. In addition, many modifications may be made to adapt a particular situation or material to the teachings of the process without departing from the essential scope thereof. Therefore, it is intended that the process not be limited to the particular embodiment disclosed as the best mode contemplated for carrying out this process, but that the process will include all embodiments falling within the scope of the appended claims. All citations referred herein are expressly incorporated herein by reference.

I claim:

1. A method for producing a methane product gas from a feed gas comprising a mixture of methane, carbon dioxide, nitrogen, oxygen, and water vapor, wherein the methane product gas is enriched in methane compared to the feed gas, which comprises the steps of:
   (a) a first pressure swing adsorption (PSA) stage wherein carbon dioxide and water vapor are removed from said feed gas to produce a first intermediate product stream enriched in methane, oxygen, and nitrogen, compared to said feed gas;
   (b) a second temperature swing adsorption (TSA) stage, wherein carbon dioxide and water are removed from said first intermediate product stream to produce a second intermediate product containing less than about 35 ppm carbon dioxide and less than about 35 ppm water vapor; and
   (c) a third PSA stage wherein nitrogen and oxygen are removed from said second intermediate product to produce said methane product gas having less than about 50 ppm carbon dioxide, less than about 0.5 ppm water vapor, less than about 5% nitrogen, and less than about 1% oxygen.

2. The method of claim 1, wherein said methane feed gas is one or more of landfill gas, natural gas, enteric fermentation gas, gob gas, manure management gas, or wastewater treatment gas.

3. The method of claim 2, wherein said methane feed gas comprises about 45% to about 60% methane, about 20% to about 40% carbon dioxide, about 5% to about 15% nitrogen, about 0.5% to about 5% oxygen, and about 0.1% to about 3% water vapor.

4. The method of claim 1, wherein said feed gas is pretreated prior to said first PSA stage to remove one or more of volatile organic compounds (VOCs), siloxanes, hydrogen sulfide, and water.

5. The method of claim 1, which utilizes an adsorbent being one or more of a zeolite, an activated alumina, a silica gel, or activated carbon.

6. The method of claim 5, wherein said first PSA stage adsorbent comprises a silica gel.

7. The method of claim 1, wherein said first PSA stage comprises at least three parallel adsorption columns, A, B, and C.

8. The method of claim 7, wherein said first PSA stage columns operate synchronously, such that while first adsorption column A is being fed (state 23), second adsorption column B undergoes pressure equalization (state 25) with third adsorption column C (state 41), followed by countercurrent blowdown (state 26), evacuation (state 32), and purge (state 36); and simultaneously, third adsorption column, C, undergoes pressure equalization (state 41) with second adsorption column B (state 25), followed by pressurization (state 46) with purified product, and at the end of column A feed step (state 23), first adsorption column A commences pressure equalization along with second adsorption column B, and third adsorption column C commences its feed step.

9. The method of claim 1, wherein said second TSA stage comprises at least three parallel adsorption columns, A, B, and C.

10. The method of claim 9, wherein said second TSA stage columns operate synchronously, such that while first adsorption column A is being fed (state 50), second adsorption column B is cooled by the effluent of column A (state 54); simultaneously, the third adsorption column C undergoes countercurrent blowdown and heating (state 62), purge (state 70), cooling via purge (state 74), followed by pressurization (state 78) with purified product; at the end of column A feed step (state 50), first adsorption column A commences countercurrent blowdown and heating, while adsorption column B commences its feed step, and third adsorption column C commences cooling by the effluent of column B.

11. The method of claim 1, wherein said third PSA stage comprises at least four parallel adsorption columns, A, B, C, and D.

12. The method of claim 11, wherein said third PSA stage columns operate synchronously, such that while first adsorption column A is being fed (state 82), second adsorption column B undergoes rinse, being fed with a recycled part of the enriched methane (stream 90), and producing as effluent (stream 92) having a composition similar to that of the feed (stream 80); the net enriched methane product is withdrawn (stream 91); the pressure in column B is incrementally higher than that in column A, allowing the effluent from column B to be combined with the feed without further compression; simultaneously, third adsorption column C undergoes countercurrent blowdown (state 94) and evacuation (state 96); simultaneously, fourth adsorption column, D, undergoes purge (state 98); followed by pressurization (state 100) with purified product; at the end of column A feed step (state 82), first adsorption column A commences rinse; adsorption column B commences countercurrent blowdown; third adsorption column C commences purge; and fourth adsorption column D commences its feed step.

13. A method for producing a methane product gas from a feed gas comprising a mixture of methane, carbon dioxide, nitrogen, oxygen, and water vapor, wherein the method product gas is enriched in methane compared to the feed gas, which comprises the steps of:
  (a) a first pressure swing adsorption (PSA) stage wherein carbon dioxide and water vapor are removed from said feed gas to produce a first intermediate product stream enriched in methane, oxygen, and nitrogen, compared to said feed gas;
  (b) a second PSA stage, wherein carbon dioxide and water are removed from said first intermediate product stream to produce a second intermediate product containing less than about 35 ppm carbon dioxide and less than about 0.35 ppm water vapor; and
  (c) a third PSA stage wherein nitrogen and oxygen are removed from said second intermediate product to produce said methane product gas having less than about 50 ppm carbon dioxide, less than about 0.5 ppm water vapor, less than about 5% nitrogen, and less than about 1% oxygen.

14. The method of claim 13, wherein said methane feed gas is one or more of landfill gas, natural gas, enteric fermentation gas, gob gas, manure management gas, or wastewater treatment gas.

15. The method of claim 14, wherein said methane feed gas comprises about 45% to about 60% methane, about 20% to about 40% carbon dioxide, about 5% to about 15% nitrogen, about 0.5% to about 5% oxygen, and about 0.1% to about 3% water vapor.

16. The method of claim 13, wherein said feed gas is pre-treated prior to said first PSA stage to remove one or more of volatile organic compounds (VOCs), siloxanes, hydrogen sulfide, and water.

17. The method of claim 13, which utilizes an adsorbent being one or more of a zeolite, an activated alumina, a silica gel, or activated carbon.

18. The method of claim 17, wherein said first PSA stage adsorbent comprises a silica gel.

19. The method of claim 13, wherein said first PSA stage and said second PSA stage, each comprise at least three parallel adsorption columns, A, B, and C.

20. The method of claim 19, wherein said first PSA stage columns operate synchronously, such that while first adsorption column A is being fed (state 23), second adsorption column B undergoes pressure equalization (state 25) with third adsorption column C, followed by countercurrent blowdown (state 26), evacuation (state 32), and purge (state 36); and simultaneously, third adsorption column, C, undergoes pressure equalization (state 41) with second adsorption column B, followed by pressurization (state 46) with purified product, and at the end of column A feed step (state 23), first adsorption column A commences pressure equalization along with second adsorption column B, and third adsorption column C commences its feed step.

21. The method of claim 13, wherein said third PSA stage comprises at least four parallel adsorption columns, A, B, C, and D.

22. The method of claim 21, wherein said third PSA stage columns operate synchronously, such that while first adsorption column A is being fed (state 82), second adsorption column B undergoes rinse, being fed with the recycled part of the enriched methane (stream 90), and producing as effluent (stream 92) having a composition similar to that of the feed (stream 80); the net enriched methane product is withdrawn (stream 91); the pressure in column B is incrementally higher than that in column A, allowing the effluent from column B to be combined with the feed without further compression; simultaneously, third adsorption column C undergoes countercurrent blowdown (state 94) and evacuation (state 96); simultaneously, fourth adsorption column, D, undergoes purge (state 98); followed by pressurization (state 100) with purified product; at the end of column A feed step (state 82), first adsorption column A commences rinse; adsorption column B commences countercurrent blowdown; third adsorption column C commences purge; and fourth adsorption column D commences its feed step.

23. A method for producing a methane product gas from a feed gas comprising a mixture of methane, carbon dioxide, nitrogen, oxygen, and water vapor, wherein the method product gas is enriched in methane compared to the feed gas, which comprises the steps of:
  (a) a first pressure swing adsorption (PSA) stage wherein carbon dioxide and water vapor are removed from said feed gas to produce a first intermediate product stream containing less than about 2% carbon dioxide and less than about 20 ppm water vapor; and
  (b) a second PSA stage wherein nitrogen and oxygen are removed from said first intermediate product to produce said methane product gas having less than about 3% carbon dioxide, less than about 30 ppm water vapor, less than about 5% nitrogen, and less than about 1% oxygen.

24. The method of claim 23, wherein said methane feed gas is one or more of landfill gas, natural gas, enteric fermentation gas, gob gas, manure management gas, or wastewater treatment gas.

25. The method of claim 23, wherein said methane feed gas comprises about 45% to about 60% methane, about 20% to about 40% carbon dioxide, about 5% to about 15% nitrogen, about 0.5% to about 5% oxygen, and about 0.1% to about 3% water vapor.

26. The method of claim 23, wherein said feed gas is pre-treated prior to said first PSA stage to remove one or more of volatile organic compounds (VOCs), siloxanes, hydrogen sulfide, and water.

27. The method of claim 23, which utilizes an adsorbent being one or more of a zeolite, an activated alumina, a silica gel, or activated carbon.

28. The method of claim 27, wherein said first PSA stage adsorbent comprises a silica gel.

29. The method of claim 23, wherein said first PSA stage comprises at least three parallel adsorption columns, A, B, and C.

30. The method of claim 25, wherein said first PSA stage columns operate synchronously, such that while first adsorption column A is being fed (state 23), second adsorption column B undergoes pressure equalization (state 25) with third adsorption column C, followed by countercurrent blowdown (state 26), evacuation (state 32), and purge (state 36); and simultaneously, third adsorption column, C, undergoes pressure equalization (state 41) with second adsorption column B, followed by pressurization (state 46) with purified product, and at the end of column A feed step (state 23), first adsorption column A commences pressure equalization along with second adsorption column B, and third adsorption column C commences its feed step.

31. The method of claim 13, wherein said second PSA stage comprises at least four parallel adsorption columns, A, B, C, and D.

32. The method of claim 31, wherein said second PSA stage columns operate synchronously, such that while first adsorption column A is being fed (state 82), second adsorption column B undergoes rinse, being fed with the recycled part of the enriched methane (stream 90), and producing as effluent (stream 92) having a composition similar to that of the feed (stream 80); the net enriched methane product is withdrawn (stream 91); the pressure in column B is incrementally higher than that in column A, allowing the effluent from column B to be combined with the feed without further compression; simultaneously, third adsorption column C undergoes countercurrent blowdown (state 94) and evacuation (state 96); simultaneously, fourth adsorption column, D, undergoes purge (state 98); followed by pressurization (state 100) with purified product; at the end of column A feed step (state 82), first adsorption column A commences rinse; adsorption column B commences countercurrent blowdown; third adsorption column C commences purge; and fourth adsorption column D commences its feed step.

33. A method for producing a methane product gas from a feed gas comprising a mixture of methane, carbon dioxide, nitrogen, oxygen, and water vapor, wherein the method product gas is enriched in methane compared to the feed gas, which comprises the steps of:

(a) a first pressure swing adsorption (PSA) stage wherein carbon dioxide and water vapor are removed from said feed gas to produce a first intermediate product stream containing less than about 35 ppm carbon dioxide and less than about 0.35 ppm water vapor; and (b) a second PSA stage wherein nitrogen and oxygen are removed from said first intermediate product to produce said methane product gas having less than about 50 ppm carbon dioxide, less than about 0.5 ppm water vapor, less than about 5% nitrogen, and less than about 1% oxygen.

34. The method of claim 33, wherein said methane feed gas is one or more of landfill gas, natural gas, enteric fermentation gas, gob gas, manure management gas, or wastewater treatment gas.

35. The method of claim 33, wherein said feed gas is pre-treated prior to said first PSA stage to remove one or more of volatile organic compounds (VOCs), siloxanes, hydrogen sulfide, and water.

36. The method of claim 33, which utilizes an adsorbent being one or more of a zeolite, an activated alumina, a silica gel, or activated carbon.

37. The method of claim 36, wherein said first PSA stage adsorbent comprises a silica gel.

38. A method for producing a methane product gas from a feed gas comprising a mixture of methane, carbon dioxide, nitrogen, oxygen, and water vapor, wherein the methane product gas is enriched in methane compared to the feed gas, which comprises the steps of employing at least 4 parallel adsorption columns, A, B, C, and D, wherein a first adsorption column A is being fed (state 82), a second adsorption column B undergoes rinse, being fed with a recycled part of the enriched methane (stream 90), and producing an effluent (stream 92) having a composition similar to that of the feed (stream 80); the net enriched methane product is withdrawn (stream 91); the pressure in column B is incrementally higher than that in column A, allowing the effluent from column B to be combined with the feed without further compression; simultaneously, a third adsorption column C undergoes countercurrent blowdown (state 94) and evacuation (state 96); simultaneously, a fourth adsorption column, D, undergoes purge (state 98); followed by pressurization (state 100) with purified product; at the end of column A feed step (state 82), first adsorption column A commences rinse; adsorption column B commences countercurrent blowdown; third adsorption column C commences purge; and fourth adsorption column D commences its feed step.

* * * * *